(12) United States Patent
Ohlmann

(10) Patent No.: US 6,296,473 B1
(45) Date of Patent: Oct. 2, 2001

(54) HANDLING AND COOLING SYSTEM FOR PLASTIC CONTAINER PREFORMS

(75) Inventor: Hans-Armin Ohlmann, Ayr (CA)

(73) Assignee: Ventax Robot Inc., Cambridge (CA)

( * ) Notice: Subject to any disclaimer, the term of this patent is extended or adjusted under 35 U.S.C. 154(b) by 0 days.

(21) Appl. No.: 09/134,963

(22) Filed: Aug. 18, 1998

(51) Int. Cl.$^7$ .................................................. B29C 45/72
(52) U.S. Cl. .................... 425/547; 425/548; 425/552; 425/556
(58) Field of Search .................... 425/547, 548, 425/552, 556

(56) References Cited

U.S. PATENT DOCUMENTS

| | | | |
|---|---|---|---|
| 4,836,767 | * 6/1989 | Schad et al. | 425/556 |
| 5,114,327 | * 5/1992 | Williamson et al. | 425/556 |
| 5,234,328 | * 8/1993 | Willson et al. | 425/556 |
| 5,364,585 | 11/1994 | Takeuchi . | |
| 5,569,476 | * 10/1996 | Van Manen et al. | 425/556 |

FOREIGN PATENT DOCUMENTS 2 301 308    12/1996    (GB) .

* cited by examiner

Primary Examiner—Tim Heitbrink
(74) Attorney, Agent, or Firm—R. Craig Armstrong

(57) ABSTRACT

Preforms are produced by injection molding in an injection molding machine, allowing enough pre-cooling time within the mold to create a temporary rigid skin on the preforms, and transporting the preforms to a separate cooling device. In the preferred embodiment, the step of transporting the preforms to a separate cooling device includes the steps of removing the preforms into a carrier mounted as an end-of-arm tool on a robot, the carrier having a plurality of orifices to receive the preforms, and using the robot to transport the carrier and the preforms to a cooling device interface. The cooling device interface has a plurality of hoses connected thereto for pneumatically transporting the preforms from the carrier to the cooling device. The preferred apparatus thus includes a robot, and an end-of-arm tool for the robot having a plurality of orifices alignable with mold cavities in the injection molding machine once the mold halves are opened. The orifices receive the preforms once cooled sufficiently in the mold to create a temporary rigid skin. A separate preform cooling device is configured to receive preforms from the orifices when the end-of-arm tool is transported to the cooling device by the robot. Preferably, there is an interface unit having a plate with a plurality of openings alignable with the orifices and having a plurality of hoses connected one to each opening to pneumatically transport the preforms from the orifices, through the openings and the tubes, to cooling tubes in the cooling device.

1 Claim, 11 Drawing Sheets

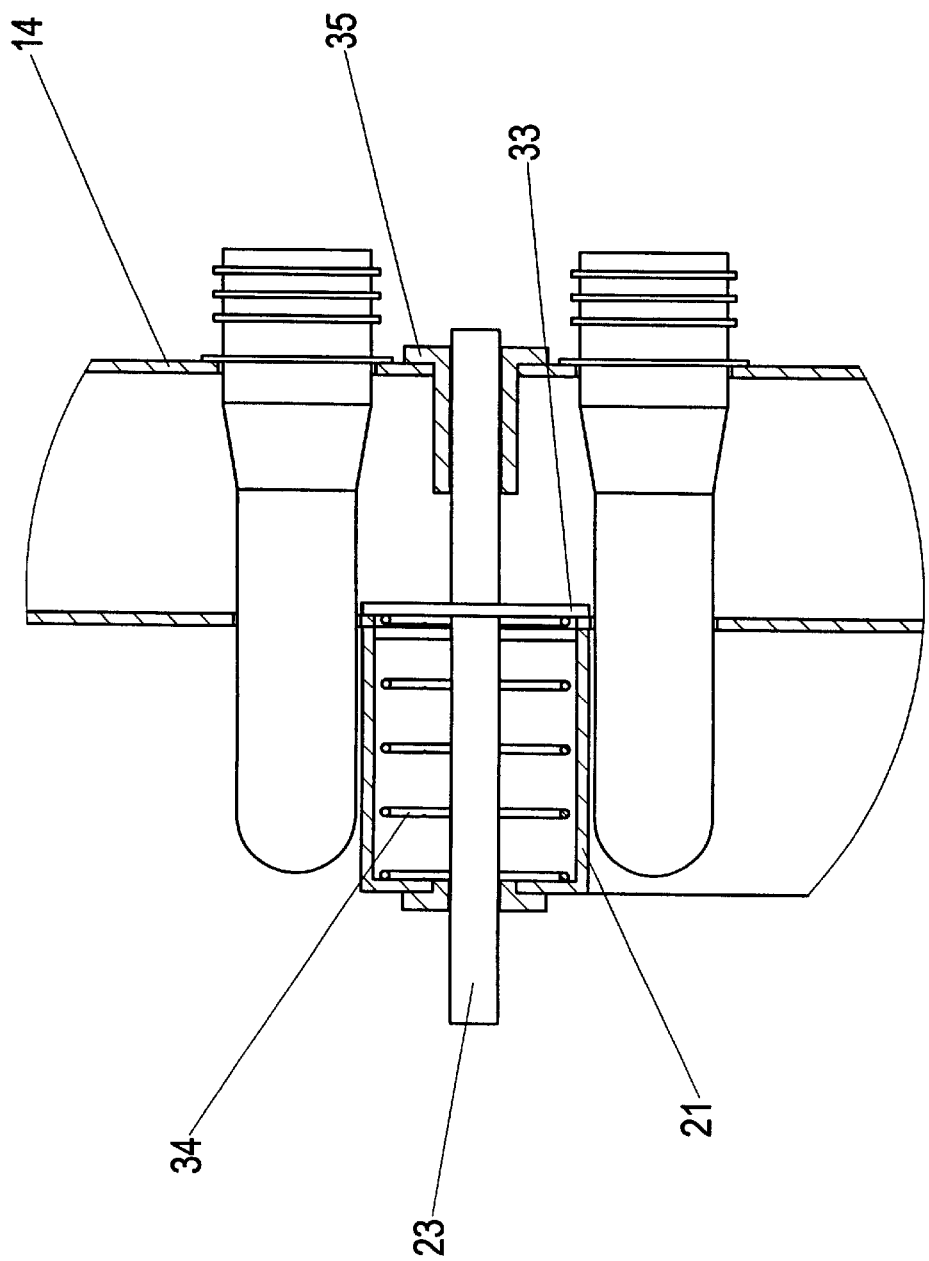
Figure 3.1

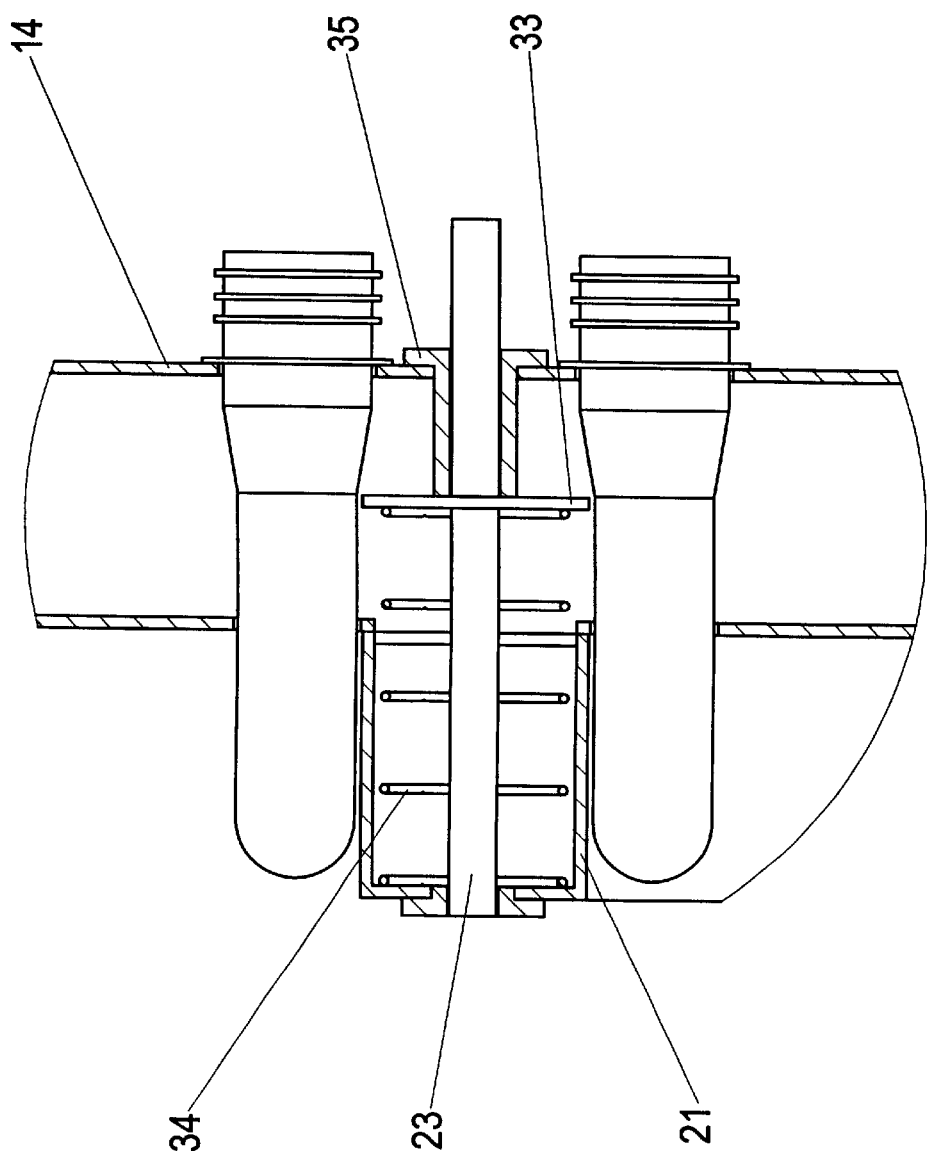
Figure 3.2

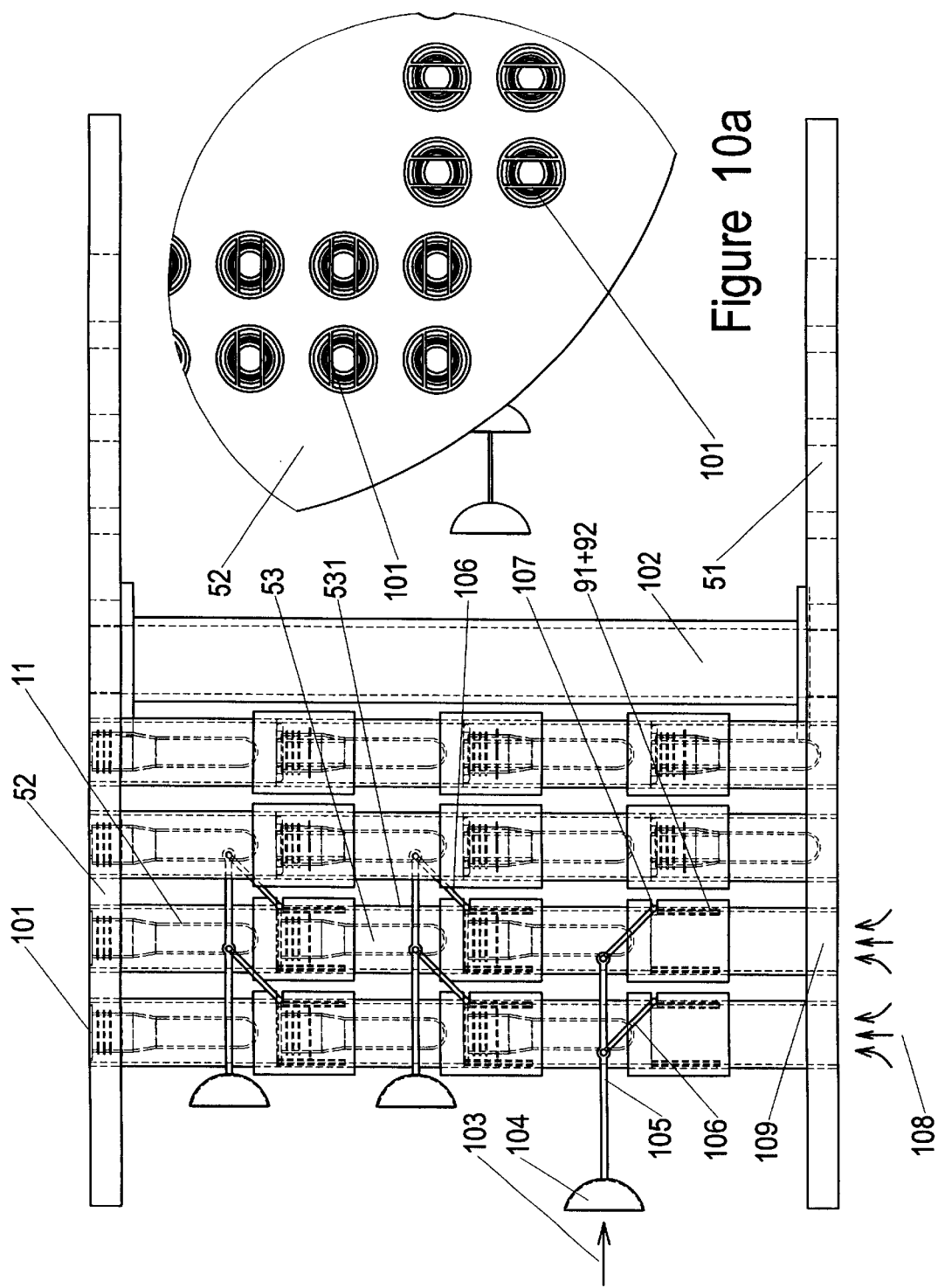

HANDLING AND COOLING SYSTEM FOR PLASTIC CONTAINER PREFORMS

BACKGROUND OF THE INVENTION

1. Field of the Invention

This invention relates to a handling and cooling system for preforms, made of thermoplastic materials and produced in multi-cavity molds with injection molding machines.

Preforms are cylindrical tubes with one hemispherically closed end and an opposite open end with a ring shaped shoulder and a threaded sleeve. Superficially, they look pretty much like test tubes. Preforms are the initial material for thin wall containers, i.e., bottles for soft drinks, detergents etc., produced with blow molding machines.

Depending on the size of the container to be blow-formed, the preforms have different sizes, particularly in length and wall thickness whereas the diameters are somewhat standardized with the reference diameters being 22, 28 and 38 mm, measured on the outside of the thread.

2. Description of the Prior Art

All production processes for preforms use injection molding machines for transforming the raw material in the shape of firm plastic pellets into a plasticized, deformable melt which is injected, actually pressed, into the cavities of the mold, which determine the shape of the preforms. For the purpose of even melt distribution between the cavities, they are grouped in multiples of four, which means a mold can have from four, eight, sixteen, forty eight up to ninety six cavities.

Typically, and paradoxically the molds themselves consist of three "halves"; the "hot half" and the "cold half", firmly attached to one another and installed on the fixed platen of the injection molding machine. The hot half contains all the heated channels for the distribution of the hot plastic melt to the cavities. The cold half essentially houses the cavities and the cooling channels where cooling liquid, normally chilled water, circulates for cooling the freshly formed preforms at least to the extent that they acquire a temporarily rigid skin, so that they can be released from their cavities without immediate deformation.

The third portion of the mold, installed on the moving platen of the Injection molding machine, accommodates the "mechanical art" of the process with the patterns of the open end of the preform, i.e., ring shaped shoulder and threads, necessitating, for instance, slides for lateral motion facilitating the release of recessed portions of the preforms; furthermore the so-called cores, which form the inner shape of the product.

Ideally, the preforms should sit in their cavities until they are massively cooled down to about ambient air temperature, to prevent any deformation upon their release from the mold. But since the injection molding machine and the mold are the most capital expensive components in the production process of preforms, to allow them to remain in the cavities for such period of time is economically unacceptable. In general, the solution to this problem is to down cool the preforms outside the mold, after their release from the latter. This, in turn, means that the preforms need to be down cooled enough to acquire the above mentioned rigid skin, which allows for adequate time for handling them without causing deformations. Due to residual heat in the preform's material, the rigid surface skin fades away quite fast which again makes further handling impossible. Thus, the post molding process of handling preforms becomes an economical balancing act. It ought not require too much pre-cooling time within the mold, on the one hand, and it must not jeopardize the quality of the preforms, which ultimately are to be bulk packed in boxes for transportation, on the other hand; quality in this case meaning no deformation.

With the above ramifications, it goes without saying that the post mold handling of preforms mandates the use of robotic equipment, mainly and mostly consisting of a linear robot, an end-of-arm tool and a cooling device. While there are various competing systems operating in the preform producing industry, one system has gained wide spread distribution in the global market, because of its high quality output, but it is extremely expensive. At the core of this system we see an end-of-arm tool which is close to identical to three "cold halves" of a mold. They are laterally, firmly attached to each other and can accommodate three production cycles of an injection molding machine. The resulting dwelling time of the preforms in the cavities of the end-of-arm tool, i.e., three times the cycle time of the injection molding machine, plus the fact that these cavities are cooled by circulating coolant, just as in the "cold half" of the mold itself, facilitate the cooling down of the preforms to the point where they can be dropped without peril to quality. The drawbacks of this system are: that it is extremely expensive, that it has a large foot print, that there is relatively slow motion of the end-of-arm tool because of its excessive mass, that it requires a heavy robot to move the end-of-arm tool, and that it requires a relatively long mold intrusion time.

SUMMARY OF THE INVENTION

The object of this invention is to provide a preform handling system which, avoiding the above listed drawbacks, offers better cost efficiency and needs a smaller foot print, with the robotic part of it being substantially lighter and faster, facilitating a shorter mold intrusion time. The quality of the preforms has to be at least competitive. An additional operational advantage is the fact that the cooling device of the system, according to the invention, operates independently from mold dimensions and the number of cavities; to a certain extent it even tolerates different preform sizes.

The approach, according to this invention, is to allow for some pre-cooling time within the mold, just enough to create a temporary rigid skin on the preforms, and transport them as quickly as possible to the interface with the cooling device.

The invention thus includes the steps of producing the preforms by injection molding in a mold in an injection molding machine, allowing enough pre-cooling time within the mold to create a temporary rigid skin on the preforms, and transporting the preforms to a separate cooling device.

In the preferred embodiment, the step of transporting the preforms to a separate cooling device includes the steps of removing the preforms into a carrier mounted as an end-of-arm tool on a robot, the carrier having a plurality of orifices to receive the preforms, and using the robot to transport the carrier and the preforms to a cooling device interface. The cooling device interface has a plurality of hoses connected thereto for pneumatically transporting the preforms from the carrier to the cooling device.

The preferred apparatus thus includes a robot, and an end-of-arm tool for the robot having a plurality of orifices alignable with mold cavities in the injection molding machine once the mold halves are opened. The orifices receive the preforms once cooled sufficiently in the mold to create a temporary rigid skin. A separate preform cooling device is configured to receive preforms from the orifices when the end-of-arm tool is transported to the cooling device by the robot. Preferably, there is an interface unit having a plate with a plurality of openings alignable with the orifices and having a plurality of hoses connected one to each opening to pneumatically transport the preforms from the orifices, through the openings and the tubes, to cooling tubes in the cooling device.

Further details of the invention will be described or will become apparent in the detailed description which follows.

BRIEF DESCRIPTION OF THE DRAWINGS

The invention will now be described in greater detail, with reference to the accompanying drawings, in which:

FIG. 3.1 shows an elevated cut through the integrated vacuum interruption valve;

FIG. 3.2 shows the same valve in a "vacuum conduit" position;

FIG. 10 shows an elevated side view corresponding to FIG. 9; and FIG. 10a is a partial top view of the upper disk.

DETAILED DESCRIPTION OF THE PREFERRED EMBODIMENT(S)

Figure 1:
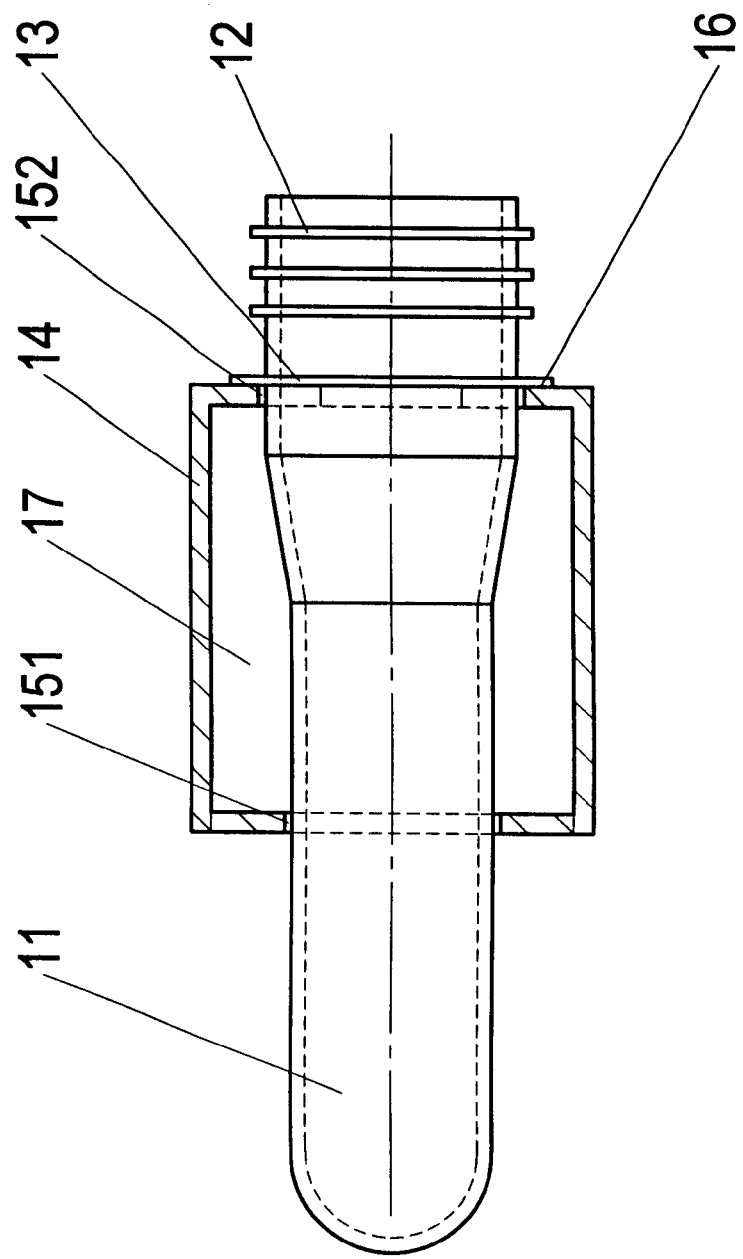
FIG. 1 shows a typical preform sitting in its orifices of the vertical square channel.

As discussed briefly above, the invention allows for some pre-cooling time within the mold, just enough to create a temporary rigid skin on the preforms, and then transports them as quickly as possible to the interface with the cooling device. To that end, both the end-of-arm tool and the moving parts of the take-out robot have to be of light weight, reducing mass forces as these occur during acceleration and deceleration. At the same time, these components have to be rigid in shape so that they properly support the preforms in transition. In addition to using light materials, i.e., plastic composites or light metal alloys, the mechanical design has to take these prerequisites into account. Thus, the robotic part of the system has only two horizontal axes, with the X-axis moving parallel to the center line of the injection molding machine and the Z-axis perpendicular to it, horizontally, so vertical motion, having to fight gravity, is eliminated. The X-axis' stroke is short, just about the maximum length of any preform to be produced and, having only two ends of stroke, can be pneumatically driven. The Z-axis is equipped with electrical AC motor drive CNC-servo controlled, to facilitate various stops, one in the mold and a number of them outside, at the interface with the cooling device, and furthermore to allow for "profiling" the motions for smoother operation (acceleration and deceleration).

The end-of-arm tool has to have as many holding orifices as are cavities in the mold, with an identical arrangement of dimensions, so that a complete "shot", i.e., production cycle of the injection molding machine is accommodated. So, while the mold is opening to release readily formed and sufficiently pre-cooled preforms, the Z-axis of the robot starts to move the end-of-arm tool into the mold area, ultimately stopping on the center line, i.e., exactly aligning the orifices of the end-of-arm tool with the cavities in the mold. Then, at the same time, the core pins in the mold move forward, partially pushing the preforms towards the end-of-arm tool, while the latter is moved towards the preforms by the X-axis of the take-out robot. As soon as the preforms are sitting firmly in the orifices of the end-of-arm tool, confirmed by a vacuum sensor signal, the X-axis and the core pins retract and the Z-axis can start to move the end-of-arm tool out the mold area, allowing the mold to close again for producing the next "shot". The so-called mold intrusion time runs from the start of the Z-axis moving into the mold area until the retracting Z-axis sends its mold-close-allowance signal to the injection molding machine control. Typically, the mold intrusion time for a preform handling system, according to the invention, in conjunction with a 48 cavity mold should only be a maximum 2.0 seconds, with an overall cycle time of about 12 seconds.

In order for the end-of-arm tool to be light weight and able to sufficiently support the preforms at the same time, so that the preform will not bend during acceleration and deceleration, the end-of-arm tool is mass-wise stripped down to a minimum of components. For a typical 48-cavity arrangement, it will consist only of four vertical square channels of aluminum or plastic composite, with 12 orifices on each of its opposing sides, for accommodating the preforms, and four horizontal support square channels attached to the Z-axis of the take-out robot. The horizontal support channels are also used as vacuum conduits to the vertical channels with the preforms orifices. Correspondingly, the four horizontal support channels are fitted with a collector channel on their one ends, and the collector channel itself is fitted with a muff for connecting a flexible hose, which in turn connects the end-of-arm tool with a central vacuum generator. As soon as all preforms are sitting in their orifices, the central vacuum builds up and subsequently the vacuum sensor signals "parts in place", which in turn enables the take-out cycle to continue. Whenever one or more preforms are missing, this signal does not come about in time, which fact will be used to trigger remedial action. So, the end-of-arm tool has no suction cups, parts-in-place sensors, wiring, plumbing, etc., thus staying light weight.

Outside the mold, the end-of-arm tool in the preferred embodiment puts in four stops at the cooling device interface, transferring, according to our example of 48 cavities, 12 preforms per stop. The stops, of course, are performed by the robot with alternating actions between the Z and X-axes.

At the first stop, the first of the four vertical end-of-arm tool channels align with the vertical row of 12 corresponding orifices in the interface with the cooling device and the robot's X-axis moves forward to bring the preforms, with their open ends, close to those interface orifices. These orifices simply are the open ends of 12 flexible hoses, attached to a vertical support bar with 12 matching bores. Thus, all it takes to make the cooling device interface adjustable so as to match any vertical pitch in the end-of-arm tool and the mold respectively is to attach a vertical interface bar with the matching bore pattern. According to our example of 48 cavities, our preform handling system subsequently transfers four times 12 preforms from the end-of-arm tool into the cooling device. Of course, with for example 4 vertical bars in the interface, supporting 12 flexible hose ends each, the transfer of the preforms would happen with only one stop of the end-of-arm tool, or for instance two transfer stops for a 96 cavity mold. This is a valid option but would lead to a larger foot print of the cooling device and less intensive usage of available vertical space. On the other hand, the remaining out-of the-mold-time of about 10 seconds, according to our example, allows for four transfer stops at the interface, ultimately feeding four preforms into each of the 12 flexible hoses.

Basically and in general, the interface between the end-of-arm tool and the cooling device mainly consists of a number of flexible hoses with their inside diameters matching the dimensions of the preforms in a manner to allow the preforms, carried by an air flow, passing axially through them even if they are bent into the shape of a 90° elbow with an appropriate radius. Depending on the number of cavities and the production capacity of the injection molding machine, the number of flexible hoses will be identical to the number of cavities or a fraction of this number with the maximum divisor equal to the number of vertical rows of cavities in a mold. At their other ends, opposite to their end-of-arm tool sides, the flexible hoses are attached to the horizontal entrance plate of the cooling device, which can have a pattern of orifices totally independent from the cavity pattern of the mold. This opens up the freedom of designing the cooling device strictly according to relevant thermodynamic and economical considerations.

Now, the actual cooling device is an indexing drum with a multitude of tubes or hoses vertically attached to its top and bottom horizontal circular disks. Constituting the actual cooling section, the tubes are organized in sectors, their position pattern arranged in an optimal fashion; optimal meaning grouped as closely to each other as design-wise feasible, achieving the smallest possible foot print. The number of sectors, the quantity of tubes in one sector and the length of the tubes, depend on a host of parameters, i.e., number of cavities in the mold, cycle time and production capacity of the injection molding machine; dimensions, mass, temperature and ultimately residual heat in the preforms; temperature and relative humidity of the ambient air as the coolant, resulting dwelling time of the preforms in the cooling device, etc. Typically one such drum can have three to eight sectors but is not limited to this quantity. The two horizontal disks have a multitude of bores, corresponding in diameter and position patterns with the vertical tubes. The distance between the top and the bottom disk corresponds with the length of these tubes, the length depending on the maximum length of the preforms to be cooled down and the quantity of preforms in one tube. The bores in the top disk have one retainer device installed, i.e., a pair of parallel pins horizontally across each bore, which allows for the upwards air flow to pass nearly unrestricted but prevents the preforms from escaping, so that they stay in the vertical position in the stream of conveying and cooling air. To prevent the following preforms from bumping into their forerunners in the same tube, retainers are inserted into the tubes in due distance from the retainer of each preform's forerunner, the distance being determined by the maximum length of the preforms to be handled in the cooling system. These "secondary" retainers are mechanically actuated, driven by pneumatical cylinders, power magnets, or a blast of pressed air for instance.

According to the invention, in our example of 48 cavities and 12 cooling tubes per drum sector, we have ultimately four preforms hovering behind each other in the 12 vertical cooling tubes, retained and separated by one firmly fixed retainer device and three inserted retainer devices; ultimately accommodating one complete "shot" or production cycle in one drum sector of the cooling device. With a few other assumptions made regarding the aforementioned parameters, our example with 48 cavities will need four drum sectors, with 12 tubes each sector, which means with an overall cycle time of 12 seconds for the injection molding machine, as previously mentioned, the preforms can dwell for about 48 seconds in the cooling drum. A rough calculation shows, that for typical preforms of the 28 mm type, as mentioned above, weighing about 30 grams each, a dwelling time of about 30 seconds in the cooling drum should suffice, if the ambient air is 30° C. and the end temperature of the preforms were to be 40° C. The design of the cooling device, according to the invention, lends itself to the possibility of individual air supply to various drum sectors, so that for instance chilled air can be used when indicated, i.e., when the temperature difference between cooling air and preforms grows too small, typically at the end of the cooling process.

As soon as one sector is filled up with preforms, in our example 48, the drum indexes and lines an empty sector up with the end-of-arm tool interface for accepting the next load of preforms. Shortly before indexing, the load of cooled down preforms has been released from the drum sector in the last indexing position, in our example number four. For releasing the preforms from the tubes, the air stream gets temporarily shut off and the three levels of moveable retainers get retracted, so that the preforms fall out of the tubes by gravity onto any out feed device, i.e., a belt conveyor. To facilitate this discharge of the cooled down preforms from the cooling system, a mechanical actuator device may be installed in the last indexing position of the drum, driven by pneumatical or solenoid means, as mentioned above for the opposite event, now to retract the moveable retainers. And another device is installed on top of the upper drum disk in the last indexing position of the drum sectors of the indexing drum, facilitating the necessary temporary interruption of the air flow. This air flow interruption device can for instance be a butterfly valve, a slide gate, or a quantity of them, actuated by means of pneumatical or electrical drives.

Of course, the indexing drum needs to be held in place and therefore is furnished with a central, vertical shaft and appropriate sets of bearings on one or both sides of this shaft. The indexing motion as such can be facilitated by means of pneumatic or electro-mechanical drives.

One more essential component of the cooling system, according to this invention, is the generator of the air stream for conveying and cooling the preforms. Given the aerodynamic characteristic anticipated for the resistance of this cooling system, the adequate ventilating fan can be of the axial fan type or the so-called low pressure radial ventilator type. This fan can be immediately attached to the upper drum disk area by means of a tapered hood, thus sitting right above the cooling section; but with an air duct between the hood and the ventilating fan, the latter can be mounted in any suitable place, i.e., beneath the ceiling or on top of the roof of the factory building. A typical fan, according to the invention and the chosen application example of 48 cavities and 28 mm preforms, would run at 0.02 bar pressure difference, 0.75 cubic metre air per second and a motor with about 3 Kw.

Although the application of the invention will not be limited to this one preferred execution, the description of its drawings is a suitable way of explaining its essential features and functions.

FIG. 1 shows a typical preform 11 sitting in its orifices 151 and 152 of the vertical square channel 14. The axial location of the preform in the channel is defined by its shoulder 13, which prevents the preform from moving further by providing a positive stop and, at the same time, a ring shaped seal area 16. As soon as all preforms have arrived at this position in the end-of-arm tool, vacuum will build up in the space 17, helping to hold the preforms in place during take out travel. Since the orifices are designed to have a defined clearance with the preforms, some air will leak through the orifice 151 which will help prevent the preform from hitting the wall of the orifice during acceleration and deceleration which would cause damage to its surface quality. For our typical example of 48 cavities, according to this invention, our end-of-arm tool will have four of these vertical channels 14 with 12 orifices 151 and 152 each.

Figure 2:
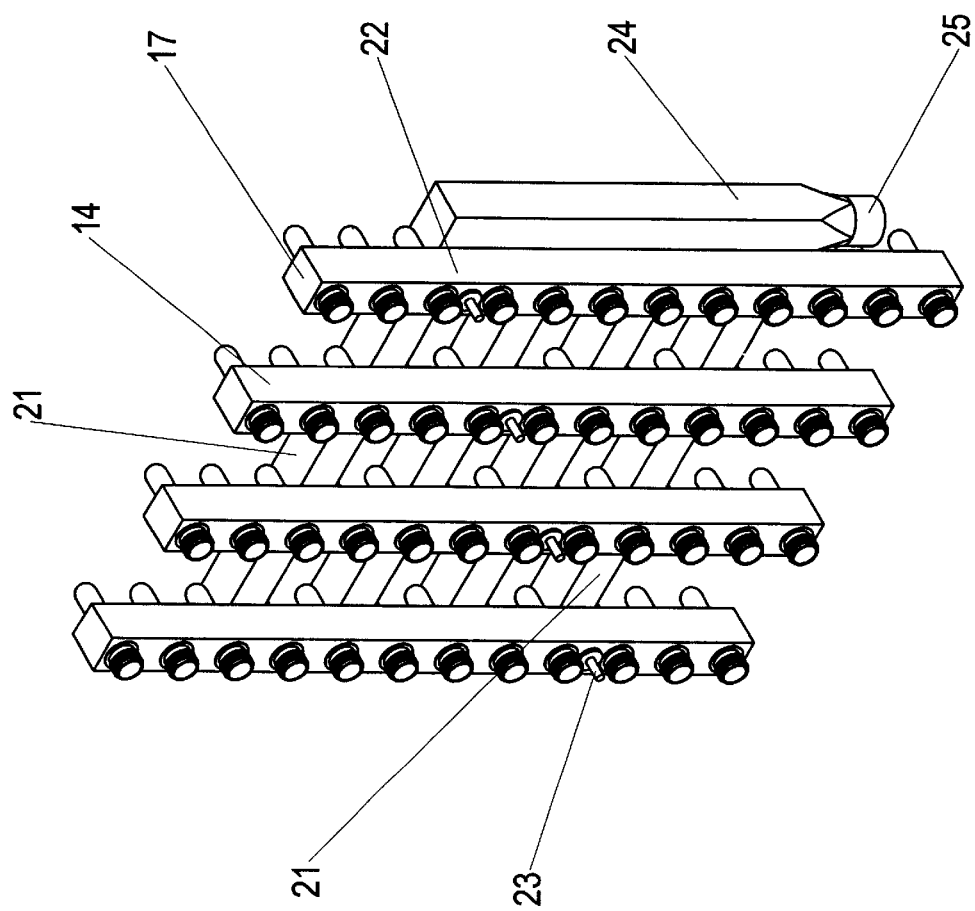
FIG. 2 shows a typical light weight end-of-arm tool.

FIG. 2 shows a typical light weight end-of-arm tool, according to the invention. Four vertical channels 14 are attached to four horizontal support channels 21 whereby the attachment may be accomplished by welding, soldering, gluing or any other suitable method. Each of the horizontal support channels 21 is paired off with one distinct vertical channel 14, so that the former not only acts as support structure but also as assigned vacuum conduit for the latter. For that, their interfacing walls are removed so that the vacuum conduit is established. Each carrier channel is fitted with a valve 22, for interrupting the vacuum conduit to its pertinent vertical orifice channel 14 for the purpose of temporarily discontinuing the vacuum supply to the pertaining vacuum space 17 in order to allow the take over of the preforms by the intake air flow of the cooling device, at the cooling device interface. Each vacuum interruption valve 22 is mechanically activated by a push rod 23, its respective position secured by a suitable mechanical arrangement, i.e. a coil spring. The four horizontal support channels 21 are individually capped at one end and have a common collector channel 24 at their other end, the latter ending in a round muff 25 for atching a flexible hose, which connects the end-of-arm tool (FIG. 2) with a vacuum generator; the latter and the flexible hose are not depicted. Also not shown is a central vacuum stop valve, i.e. of the slide gate or butterfly type, attached to the exhaust spout of the vacuum generator i.e. a radial fan. This central vacuum stop valve will briefly close, prior to the end-of-arm tool re-entering the mold, so that the vacuum in the support channels 21 will immediately break down and the coil springs 34 will push open the valve disks 33, re-establishing vacuum conduit.

FIG. 3.1 shows an elevated cut through the integrated vacuum interruption valve 22 with a vertical orifice channel 14, a horizontal carrier or support channel 21, the push rod 23 for activating, the valve disk 33 in "vacuum interrupt" position, secured by the vacuum itself within channel 21.

FIG. 3.2 shows the same valve 22 in "vacuum conduit" position with the valve disk 33 secured in its place by the force from the coil spring 34 on its one side and the sleeve of the slide pushing 35 on its other side. The square valve disk 33 is fixed to its push rod or shaft 23 by press fit.

The vacuum interruption valve is normally open according to FIG. 3.2. When the end-of-arm tool approaches the cooling device interface, the push rod 23 hits upon a body of resistence, i.e. in the shape of a bolt, and the valve closes, according to FIG. 3.1. Now the vacuum in the pertinent vertical channel 14 disappears and the take over of the preforms by the cooling device interface can occur.

Figure 4:
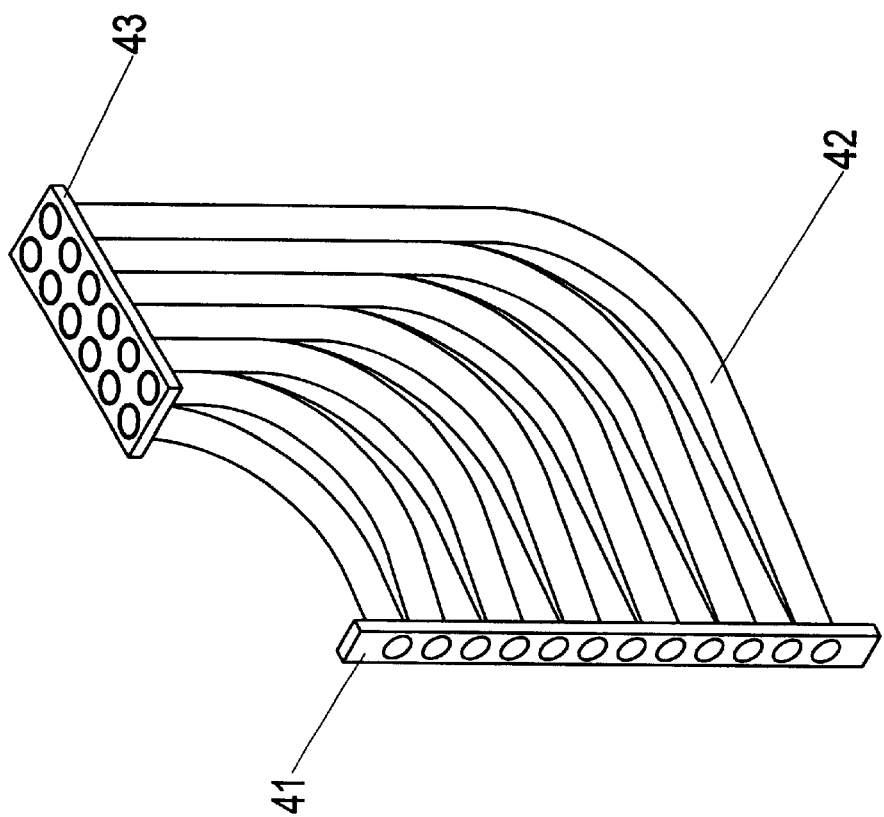
FIG. 4 shows a three-dimensional elevation of the end-of-arm tool-cooling device-interface.

FIG. 4 shows a three-dimensional elevation of the end-of-arm tool-cooling device-interface with the vertical interface bar 41 with its 12 orfices matching the vertical cavity pitch in the mold; the 12 flexible hoses 42 and the horizontal stationary entrance plate 43, matching the orifice pattern of the cooling device.

Figure 5:
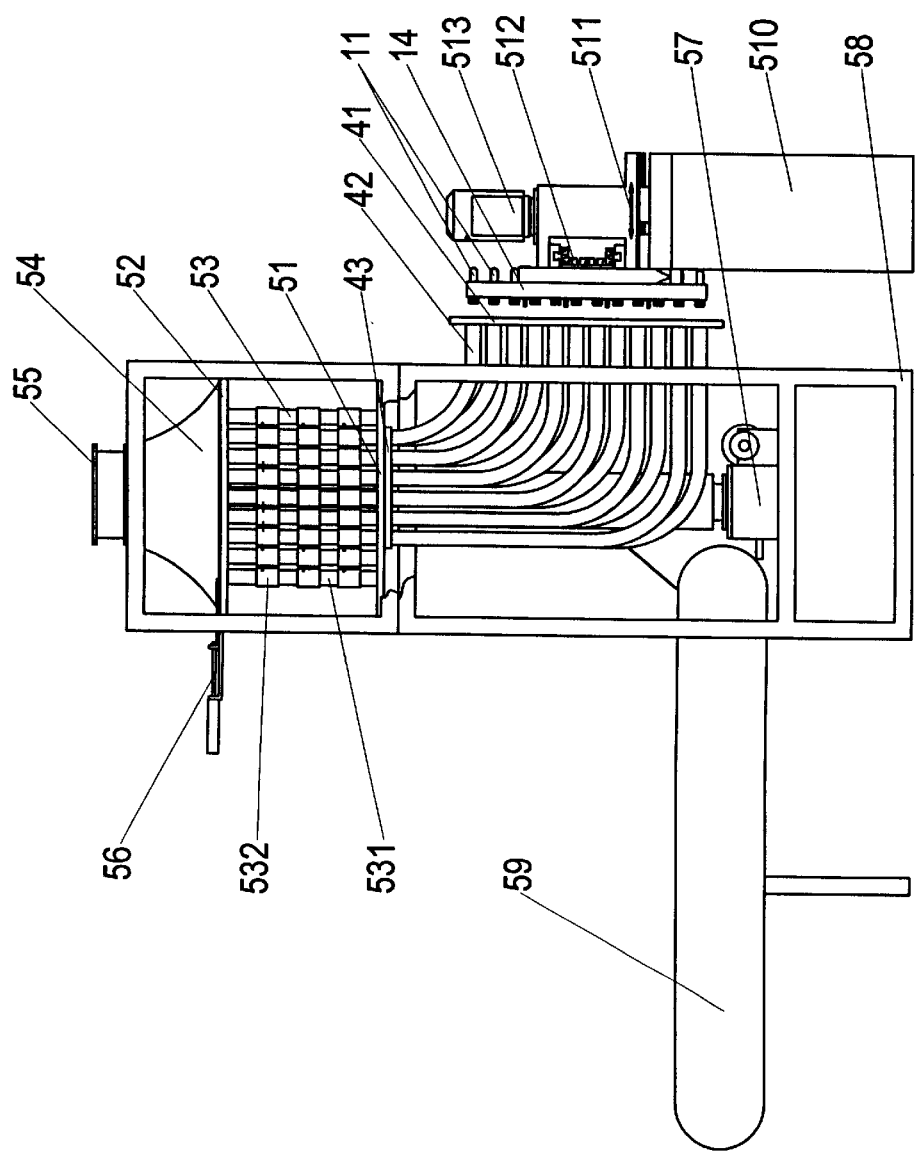
FIG. 5 is an elevated side view of the entire preform handling and cooling system, in a semi-schematic depiction looked at from the injection molding machine.

FIG. 5 is an elevated side view of the entire preform handling and cooling system, in a semi-schematic depiction looked at from the injection molding machine, showing the following features and their relations: one of the four vertical orifice channels 14; the cooling device's vertical interface bar 41; the 12 flexible interface hoses 42 linking it with the stationary horizontal entrance plate 43; the bottom disk 51 of the indexing cooling drum and the upper disk 52 thereof; 53 some of the altogether 48 vertical cooling tubes, each composed of four parts of plain tubes 531, and three housings 532 for the previously mentioned secondary retainers; the tapered hood 54 with the connection flange 55 attached to its top for ultimately connecting the cooling drum with the air flow generator, as mentioned before; finally a slide gate type of air flow interruption device 56 for temporarily interrupting the air flow in the fourth section of the cooling drum when the preforms are to be released. FIG. 5 also shows the indexing drive 57 for the cooling drum and the support structure or frame 58 of the whole system, and the outfeed conveyor 59 onto which the preforms are to be dropped. Furthermore, 510 shows the mounting stand for the side entry take out robot, 511 its X-Z-axes assembly, with the double arrow indicating the horizontal motion of the X-axis; 512 represents the Z-axis beam, its horizontal motion back and forth being perpendicular to that of the X-axis; 513 finally indicating the servo drive motor for the Z-axis.

As can easily be demonstrated, when the X-axis moves forward, that is to the left in FIG. 5 towards the interface bar 41, and the vacuum in the approaching vertical orifice channel 14 has temporarily disappeared, the preforms 11 will be sucked into the flexible hoses 42; with their open ends leading, the preforms 11 will locate with their open ends up in the vertical cooling tubes 53, enhancing the cooling down process of the preforms.

Figure 6:
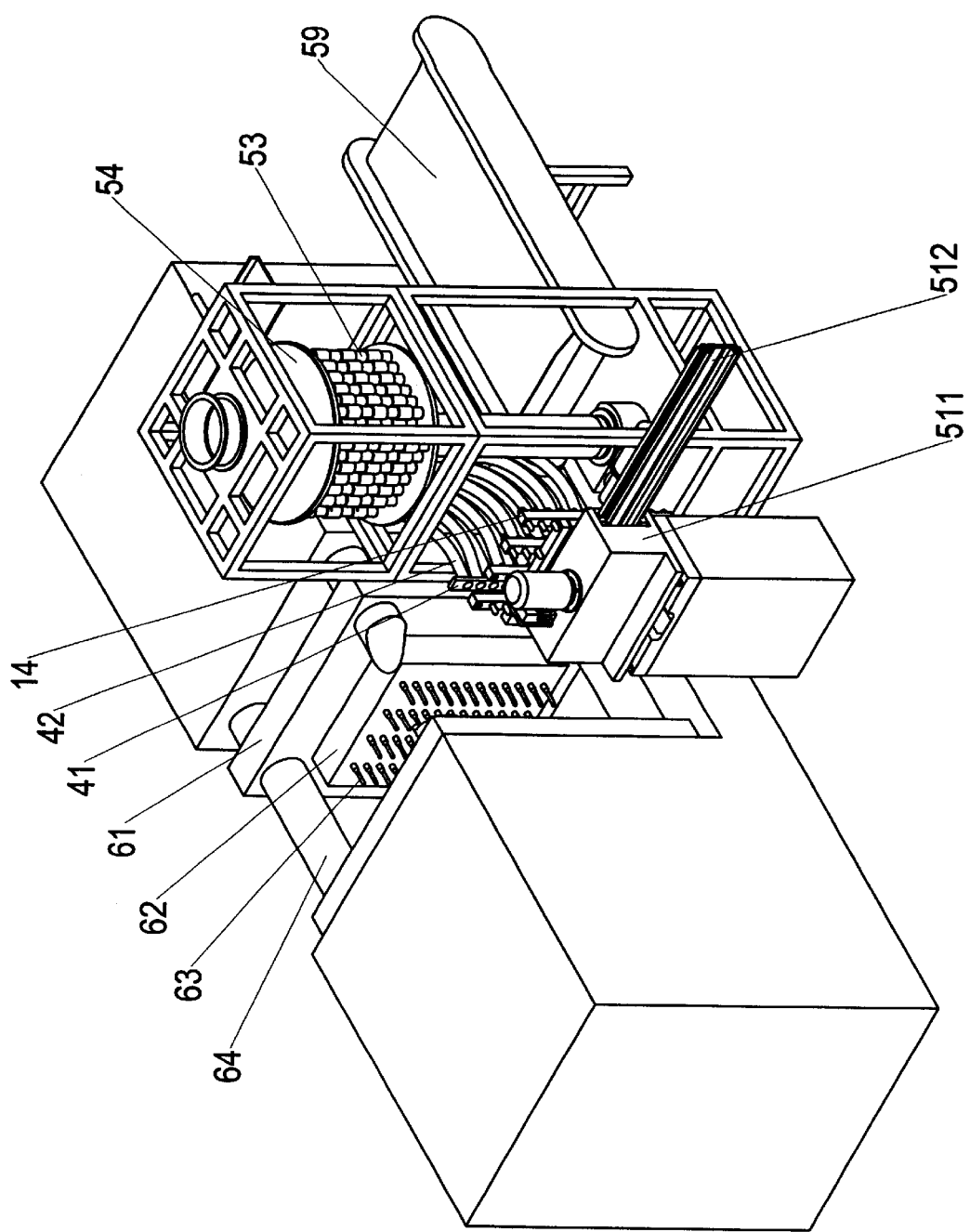
FIG. 6 is a three-dimensional elevated overview of the entire preform handling and cooling system.
Figure 7:
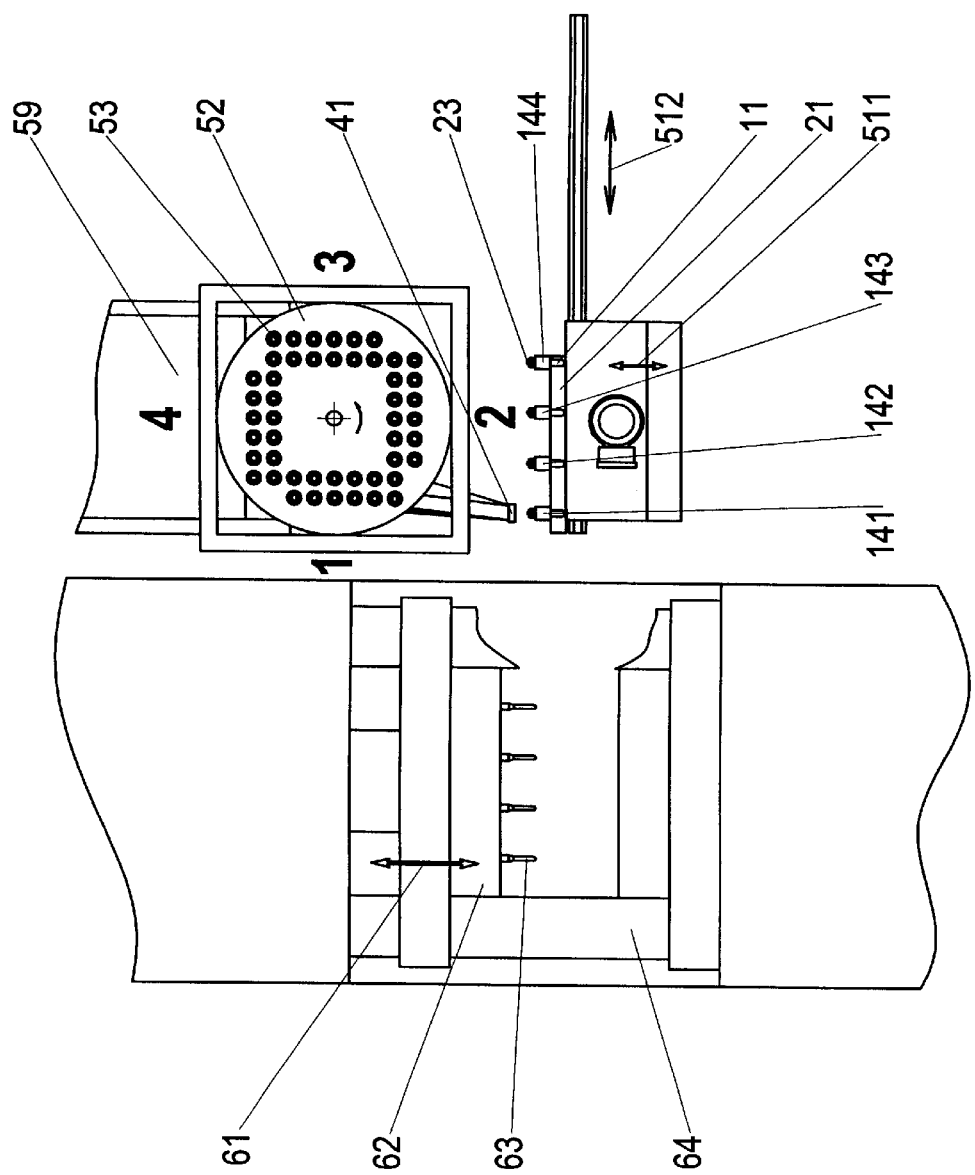
FIG. 7 is a two-dimensional top view corresponding to FIG. 6 but with the tapered hood removed.

FIG. 6 is a three-dimensional elevated overview of the entire preform handling and cooling system, according to the invention, whereas FIG. 7 is a two-dimensional top view of it, corresponding with FIG. 6 but with the tapered hood 56 removed in FIG. 7, inorder to offer a plain view of the upper disk 52 of the indexing cooling drum, tray exposing its four sectors of cooling tubes and their four indexing positions 1, 2, 3 and 4. To view FIGS. 6 and 7 in conjunction enhances the comprehensive understanding of the handling process of the preforms and the underlying intends to optimize the material flow while minimizing the mold intrusion time; minimizing the foot print and travel distances are contributing factors. Now, FIGS. 6 and 7 show the following status of the preform handling process: the moving platen 61 of the inaction molding machine is in "mold open" position and the third mold portion 62 is visible together with a number of cores 63, with one of the upper two guide bars 64 of the injection molding machine partially removed in order to let the core pattern appear with four vertical columns of 12 cores each, according to-our chosen example of 48 cavities; the X-axis 512 has just arrived at its end position for transferring the preforms 11 which are still sitting in vertical orifice channels 14. Now, as the X-axis 511 moves towards the interface bar 41 and the vacuum conduit between the first vertical orifice channel 141 and its pertaining horizontal support channel 21 gets interrupted, as previously described, the preforms will be released from their 12 orifice channel, sucked into the flexible hoses 42 by the conveying and cooling air flow and ultimately transferred into the vertical cooling tubes 53 of the cooling device. By subsequent alternating action of the X and Z-axes, the remaining preforms 11 in the vertical orifice channels 142,143 and 144 will be transferred the same way. At the time the preforms in the last vertical orifice channel 144 have been removed, the first vertical orifice channel 141 will be sitting right at the edge of the now closed mold, waiting for the start of the next preform removal cycle, a complete cycle running as follows: upon injection and pre-cooling of the preforms, the mold part 61 opens, moving upwards in FIG. 7; the end-of-arm tool is moved into the open mold by fast Z-axis actions to the left; white the X-axis moves towards the exposed preforms still sitting on the cores 63, the preforms get ejected towards the orifices of the end-of-arm tool at the same time; the transfer of the preforms into the orifices of the vertical channels 14 is assisted by the permanent vacuum air flow in the end-of-arm tool; as soon as all preforms are correctly sitting on their respective orifices, this fact will be signalled by a vacuum sensor and the Z-axis enabled to quickly move out of the mold area, upon which the mold immediately closes again for the next material injection. The mold intrusion time is defined: as period with the Z-axis starting to move into the open mold until the mold starting to close again and it is expected to take as little time as possible, An essentially contributing factor to a shortest possible cycle time is the chosen manner of transferring the preforms not in the sequence of first arrival at the interface bar 41, i.e., with vertical channel 144 but having the X-axis run through to the end of its stroke, coinciding with aligning channel 141 with the interface bar 41, thus avoiding deceleration of the end-of-arm tool while still being within the mold area. And, while now unloading the end-of-arm tool backwards, with the vertical office channels 142, 143, 144 subsequently lining up with the interface bar 41, the end-of-arm tool automatically ends up in the perfect waiting position for re-entering the mold, which contributes to minimizing the overall cycle time.

As mentioned before, the tapered hood 54 in FIG. 6 has been removed in FIG. 7 in order to show the form indexing drum positions with number 1 showing the preform intake location, number 2 and 3 cooling locations only, and number 4 cooling and release position, while 59 showing the out-feed conveyor.

Figure 8:
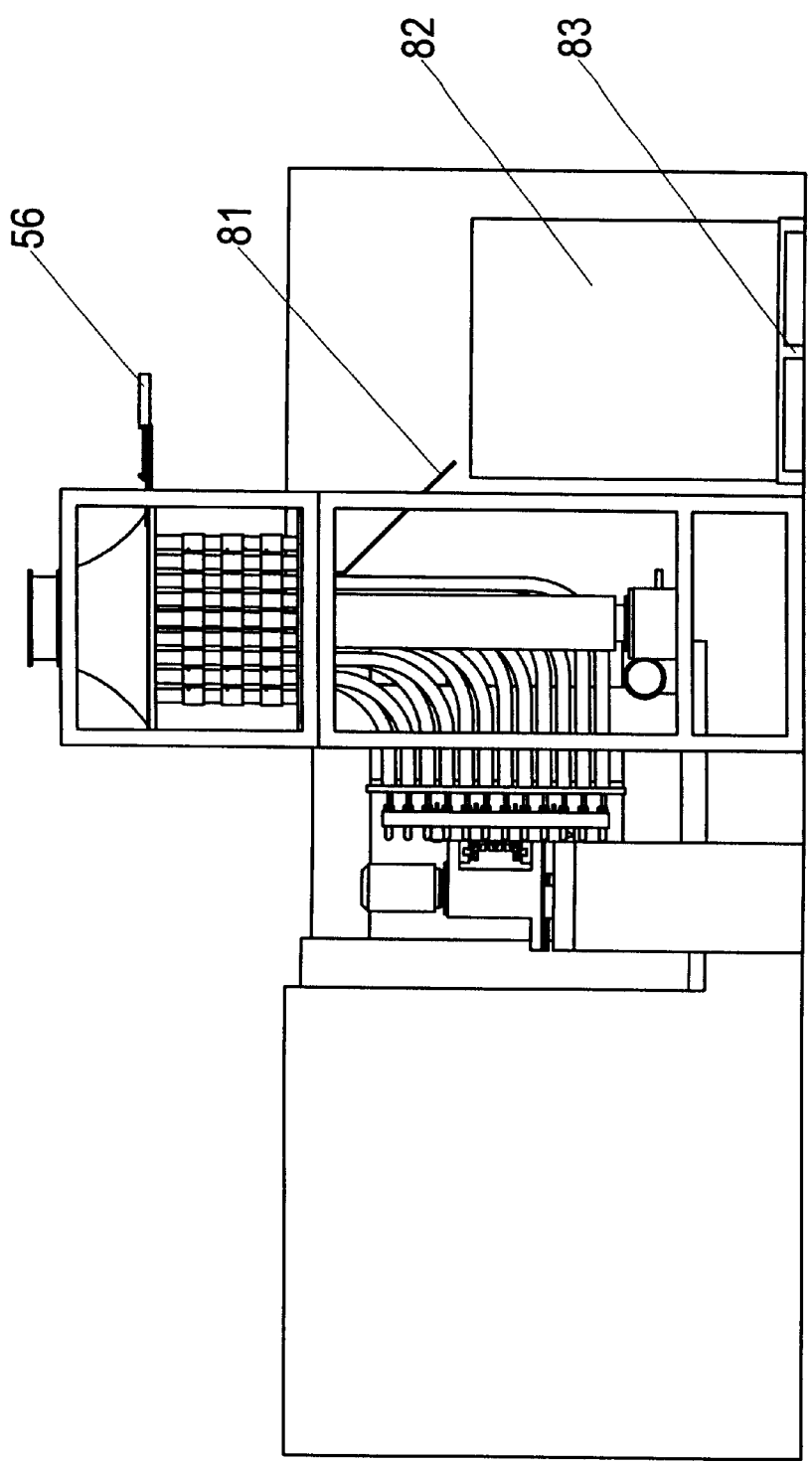
FIG. 8 shows another elevated side view of the entire system with the injection molding machine in the background.

FIG. 8 shows another elevated side view of the entire system with the injection molding machine in the background. There, the out-feed conveyor 59 of FIG. 7 is eliminated and replaced by a gaylord 82 on a transport skid 83, utilizing the fact that the indexing cooling drum is located relatively high up within the entire system. A sloped feed out chute 81 facilitates the transfer of the preforms from the cooling drum into gaylord 82. This measure assists with further reducing both the foot print and the costs of the system as a whole. Again 56 represents the slide gate type of air flow interruption valve, agitated by pneumatic cylinder, solenoid valve controlled, facilitating the release of the preforms at the end of their stay in sector location 4 by briefly interrupting the air flow in the cooling tubes 53.

Figure 9:
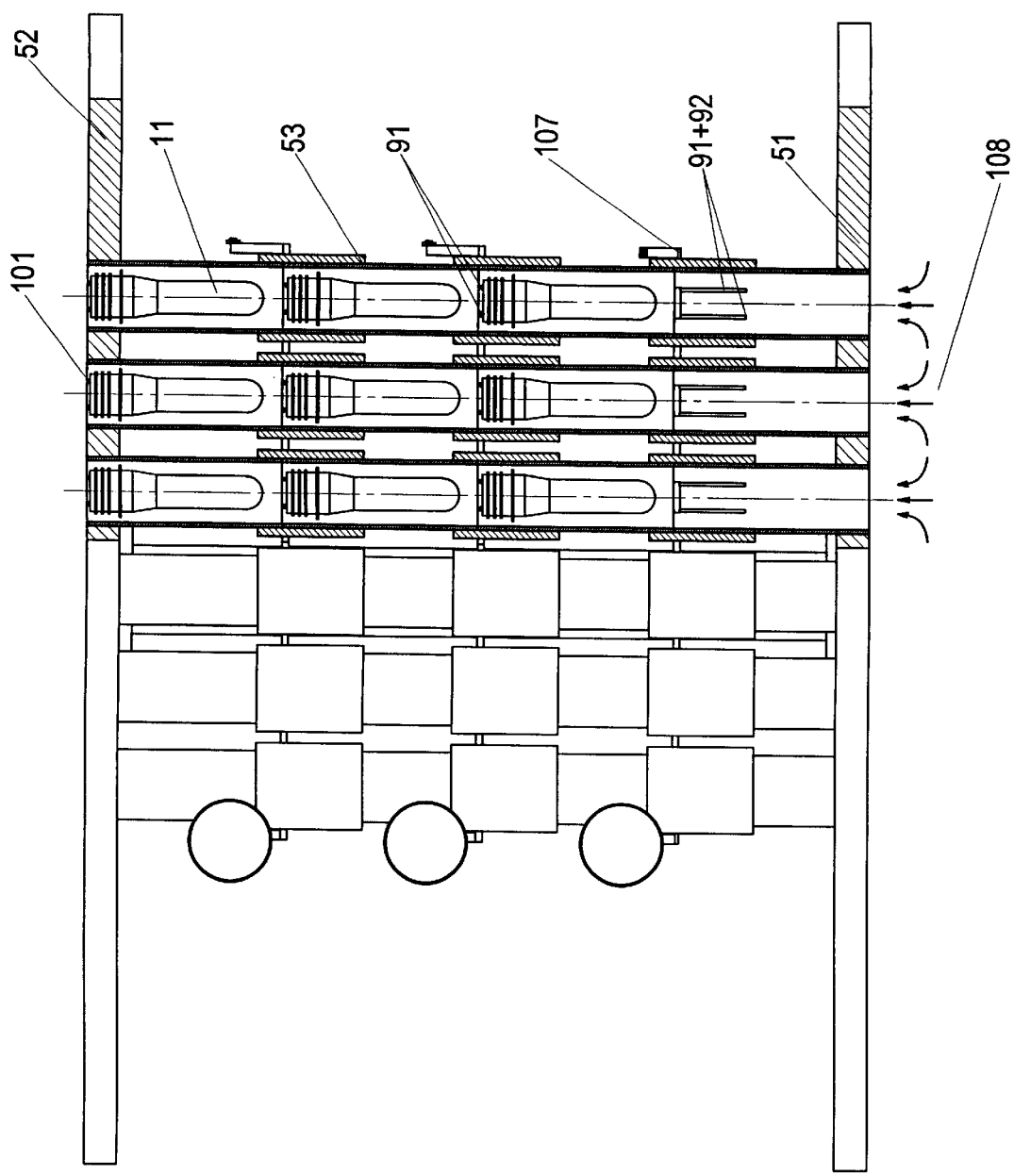
FIG. 9 shows an elevated front view, partially cut open, of a complete sector of the cooling tubes.

FIGS. 9 and 10 show an elevated front view and an elevated side view, the former partially cut open, of a complete sector of the cooling tubes, particularly to demonstrate the vertical accommodation of the preforms 11, their handling, cooling, and how they are kept apart to prevent them from binding.

Now, according to the invention and our example of 48 cavities, one sector or battery of cooling tubes 53, consists of two rows of six tubes each, thus accommodating 48 preforms in one battery of tubes 53. The tubes 53 are firmly held in place by the bottom disk 51 and the upper disk 52, the proper distance between the two disks defined by the center shaft 102.

The process status demonstrated by both FIGS. 9 and 10 is that three layers of preforms 11 have been already loaded; the upper most layer prevented from escaping the tubes 53 by the fixed retainer pins 101, as best shown in FIG. 10a as a partial top view of the upper disk 52. As soon as one layer of preforms has arrived in their locations, the previously mentioned secondary retainer pins 91 respectively beneath them get inserted to prevent the next following preforms from contacting their forerunners. As shown, the third layer has just arrived and the lower set of secondary retainer pins 91 are about to get inserted, by i.e. a blast of compressed air, or the push of a pneumatic cylinder's rod, represented by an arrow 103, onto the impulse cup 104 and the attached push rod 105, whereby the linked parallel levers 106 translate this transverse push into rotating the shafts 107 clock wise, thus pivoting the retainer pins 91 from vertical into the horizontal retaining position. In either case, there has to be a feed back signal confirming that the impulse cup has been pushed and, consequently the secondary retainer pins 91 are in horizontal retaining position. Since the cooling drum indexes and therefore preferably has no built in active electrical and pneumatical components, the feed back signal will be provided either by an air blast nozzle with built in dynamic back pressure sensor, or in the case of a pneumatic cylinder, by a reed switch. This measure helps to keep the indexing cooling drum design simple and inexpensive, without wiring and plumbing. In the FIGS. 9 and 10 the last layer of preforms can not have arrived yet because their set of secondary retainers 91 are not yet in horizontal position.

As is shown in FIGS. 9 and 10, six sets of secondary retainer pins sit on a common shaft 107 for the six cooling tubes in a row, whereby the two rows in a battery are linked by one push rod 105 and two levers 106. Neither the air blast nozzle nor the pneumatic cylinder are shown; they will be fixed to the support frame 58 as in FIG. 5, in the area of the preform intake indexing position number 1.

As already indicated earlier, when a battery of cooling tubes 53 has indexed to the preform discharge position number 4 and, at the end of the cooling cycle the air flow interruption valve 56, as in FIG. 5, has briefly shut off the air flow, the preforms will fall out of the cooling tubes 53 whereby the secondary retainer pins 91 will pivot back into vertical position and disappear flush in corresponding slots 92, cut into the tubes 531, so that no obstruction will be left within the cooling tubes 53 prior to the arrival of fresh preforms. The retainer pins 91 are put into and held in this position by gravity, now enforced by the weight of the impulse cup 104 and push rod 105 assembly, in conjunction with the 11 o'clock position of the levers 106.

Of course, the process of loading the cooling tubes and agitating the secondary retainer pins occurs in a controlled manner, sequencing in sync with the unloading of the end-of-arm tool at the interface bar 41.

It should be clearly understood that the above description relates to the preferred embodiment of the invention only, and that many variations will be possible within the scope of the invention. In particular, without limiting the generality of the preceding sentence, it should be clearly understood that references to particular numbers of preforms, channels, orifices, hoses, etc. are examples only, and could be readily varied as desired.

The invention provides a handling and cooling system which takes care of preforms from the mold in the injection molding machine well into the container of transportation for shipping. By its use of light-weight robotic and compact pneumatic components, the invention results in a fast-operating work cell with a small footprint and relative low capital and operating costs, to improve the economy of the preform production industry.

What is claimed is:

1. Apparatus for production of preforms for plastic containers, comprising an injection molding machine for injection molding of said preforms, a robot, an end-of-arm tool for said robot having a plurality of orifices alignable with mold cavities in said injection molding machine once mold halves thereof are opened, to receive said preforms once cooled sufficiently in said mold to create a temporary rigid skin on said preforms, and a separate preform cooling device configured to receive preforms from said orifices when said end-of-arm tool is transported to said cooling device by said robot, where said preforms are received from said orifices via an interface unit, said interface unit comprising a plate having a plurality of openings alignable with said orifices and having a plurality of hoses connected one to each said opening to pneumatically transport said preforms from said orifices, through said openings and said tubes, to cooling tubes in said cooling device.

* * * * *